United States Patent [19]

Koyama

[11] Patent Number: 5,798,988

[45] Date of Patent: Aug. 25, 1998

[54] OPTICAL PICKUP UNIT CAPABLE OF READING SIGNALS RECORDED ON DIFFERENT TYPES OF OPTICAL DISKS

[75] Inventor: Masayuki Koyama, Tokorozawa, Japan

[73] Assignee: Pioneer Electronic Corporation, Tokyo, Japan

[21] Appl. No.: 758,849

[22] Filed: Dec. 2, 1996

[30] Foreign Application Priority Data

Dec. 1, 1995 [JP] Japan ................................ 7-338060

[51] Int. Cl.$^6$ ...................................................... G11B 7/08
[52] U.S. Cl. ............................................ 369/44.14; 369/94
[58] Field of Search .............................. 369/44.14, 44.15, 369/44.16, 94, 58, 44.29, 44.35, 54

[56] References Cited

U.S. PATENT DOCUMENTS

| | | | |
|---|---|---|---|
| 5,097,464 | 3/1992 | Nishiuchi et al. | 369/44.24 |
| 5,202,875 | 4/1993 | Rosen et al. | 369/94 |
| 5,235,581 | 8/1993 | Miyagawa et al. | 369/58 |
| 5,526,336 | 6/1996 | Park et al. | 369/94 |

*Primary Examiner*—Thang V. Tran

*Attorney, Agent, or Firm*—Morgan, Lewis & Bockius LLP

[57] ABSTRACT

An optical pickup unit that is capable of reproducing information from two types of recording media whose thickness characteristics differ from each other and can reduce heat generated due to DC offsets generated in a focus actuator, that can suppress a change of an aberration of an objective lens due to the generated heat, and that can suppress a change of its pickup performance includes an objective lens; a lens holder for holding the objective lens; a supporting member for supporting the lens holder; an error signal generator for generating a focus error signal based on the reflected light of the light beam from the recording surface upon which the light beam is being impinged; and a focus controller for actuating and controlling the objective lens such that the light beam is converged on the information recording surface based the error signal; the supporting member supporting the lens holder such that a dead-load suspension position of the lens holder is positioned at a position where an absolute value of an offset component of the error signal obtained in controlling the focus for the first recording medium is equal to an absolute value of an offset component of the error signal obtained in controlling the focus for the second recording medium.

12 Claims, 2 Drawing Sheets

OPTICAL PICKUP UNIT CAPABLE OF READING SIGNALS RECORDED ON DIFFERENT TYPES OF OPTICAL DISKS

BACKGROUND OF THE INVENTION

1. Field of the Invention

The present invention relates to an optical pickup unit and, more particularly, to an optical pickup unit capable of reading signals recorded on different types of optical disks having disk protection films whose thicknesses are different from each other.

2. Description of Related Art

An optical pickup unit for reading recorded information from an optical recording medium, such as an optical disk, is equipped with a focusing mechanism for focusing a light beam outputted by a light source onto a recording surface of the optical recording medium to obtain a beam spot for reading necessary information. As shown in FIG. 5, this focusing mechanism is constructed such that a lens holder 3 for holding an objective lens 2 is cantilevered by a wire 4 acting as a supporting member. The lens holder 3, including the objective lens, may be actuated in a direction vertical to the disk recording surface 1c. To accomplish this, the lens holder 3 is centered at a dead-load suspension position (i.e., the position of the lens holder suspended by its dead load at the point when the lens holder is supported by a suspension base 5 in a state when no current is applied to a moving coil (not shown) wound around the lens holder). Actuation in the vertical direction occurs, for example, by an electromagnetic effect with an outer magnetic field (not shown), by applying electric current to the moving coil wound around the lens holder 3 based on a focus error signal generated based on astigmatism. The dead-load suspension position X is positioned so that a distance from the objective lens 2 to the recording surface 1c of the optical disk is approximately equal to a converging distance A of the lens. The disks are placed on the same turntable (not shown) via a protection layer 1b of the disk recording surface 1c. Element 1a of FIG. 5 corresponds to the surface of the recording medium 1 closest to the source of the light beam.

Active development is now underway with respect to a certain optical disk (hereinafter referred to as a DVD) whose protection layer for protecting its recording surface is almost half the thickness of that of a conventional compact disk (hereinafter referred to as a CD) and whose recording capacity is almost 10 times of that of the CD.

Since the CD and the DVD are both optical disks and thus have the same basic reading principle, a reproducing unit capable of reproducing information from both of these types of optical disks will soon be realized. Where both DVD and CD are envisioned, it is desirable to be able to commonly use one optical pickup unit for reading recorded information, in view of advantageous miniaturization of the equipment. However, the thickness of the protection layer for protecting the recording surface of the CD is twice that of the DVD. That is, while the CD has a protection layer of about 1.2 mm in thickness, the DVD protection layer has a thickness of about 0.6 mm.

Furthermore, when the focus for both disks is controlled by an optical pickup unit having an objective lens of single-focal point, the center of actuation in actuating the lens following to the focus control will differ in controlling the focus for the other disk when the dead-load suspension position is determined based on the thickness of the protection layer of either one disk. Accordingly, a DC component (DC offset) is always applied to the moving coil. For example, when the lens holder 3 is positioned based on the thickness of the protection layer of the CD, the dead-load suspension position X shown in FIG. 4a becomes the center of actuation in controlling the focus for the CD and no DC offset is generated. However, for the DVD, the center of actuation is located at position X' distant from the disk surface by about 0.6 mm with respect to the dead-load suspension position X as shown in FIG. 4b because the protection layer 1b is thinner than that of the CD by about 0.6 mm. Thus, because the focus is controlled so that the lens is separated from the dead-load suspension position X always by 0.6 mm in controlling the focus for the DVD, a stationary current (direct current offset), which is equivalent to actuating the lens by 0.6 mm, must be applied to the moving coil.

The moving coil has a resistor so that it generates heat when the DC offset is applied. Therefore, a problem arises in that the aberration of the objective lens is changed by the heat, thus causing a change of the pickup performance in reproducing information from the CD and from the DVD.

SUMMARY OF THE INVENTION

Accordingly, the present invention is directed to an optical pickup unit that substantially obviates one or more of the problems due to limitations and disadvantages of the related art. That is, an object of the present invention is to solve the aforementioned problem by providing a novel optical pickup unit.

Additional features and advantages of the invention will be set forth in the description which follows, and in part will be apparent from description, or may be learned by practice of the invention. The objectives and other advantages of the invention will be realized and attained by the structure particularly pointed out in the written description and claims hereof as well as the appended drawings.

To achieve these and other advantages and in accordance with the premise of the present invention, as embodied and broadly described, the present invention relates to an optical pickup unit for irradiating a light beam to a first recording medium having a first disk surface, a first information recording surface, and a first distance between the first disk surface and the first information recording surface, and to a different than the first distance second recording medium having a second disk surface, a second information recording surface, and a second distance between the second disk surface and the second information recording surface, to read recorded information based on reflected light of the light beam from the information recording surface upon which the light beam is being impinged, the optical pickup unit including a beam generator for generating light beam; an objective lens; a lens holder for holding the objective lens; a supporting member for supporting the lens holder; an error signal generator for generating a focus error signal based on the reflected light of the light beam from the recording surface upon which the light beam is being impinged; and a focus controller for actuating and controlling the objective lens such that the light beam is converged on the information recording surface based on the error signal; the supporting member supporting the lens holder such that the dead-bolt suspension position of the lens holder is positioned at a position where an absolute value of an offset component of the error signal obtained in controlling the focus for the first recording medium is equal to an absolute value of an offset component of the error signal obtained in controlling the focus for the second recording medium.

According to another embodiment of the present invention, an optical pickup unit for irradiating a light beam to a multi-layered recording medium having a disk surface, a plurality of information recording surfaces, and a plurality of different distances from the disk surface to the plurality of information recording surfaces, respectively, to read recorded information based on reflected light of the light beam from the information recording surfaces upon which the light beam is being impinged, the optical pickup unit comprises a beam generator for generating the light beam, an objective lens, a lens holder for holding the objective lens, a supporting member for supporting the lens holder, an error signal generator for generating a focus error signal based on the reflected light of the light beam from the recording surfaces upon which the light beam is being impinged, and a focus controller for actuating and controlling the objective lens such that the light beam is converged on the information recording surface based on the error signal, the supporting member supporting the lens holder such that a dead-load suspension position of the lens holder is positioned at a position where an absolute value of an offset component of the error signal obtained in controlling the focus for one information recording surface of the recording medium is equal to an absolute value of an offset component of the error signal obtained in controlling the focus for another information recording surface of the recording medium.

In another embodiment of the present invention, an optical pickup unit for irradiating a light beam on recording surfaces of recording media to read recorded information based on reflected light of the light beam from the information recording surfaces, each of the recording media comprising a disk surface, and each of the recording surfaces being separated from its corresponding disk surface by a different distance, the optical pickup unit comprises a beam generator for generating the light beam, a lens, a lens holder for holding the lens, and a supporting member for supporting the lens holder at a dead-load position of the lens holder which is substantially equidistant from a focal position for a first one of the recording surfaces and a focal position for a second one of the recording surfaces.

According to the present invention constructed as described herein, when the lens holder for holding the objective lens is to be supported, the suspension position of the lens holder by the dead-load thereof (including the objective lens) is positioned such that the absolute value of the offset component of the error signal obtained in controlling the focus for the first disk, whose protection layer has a first thickness, is equal to that of the second disk whose protection layer has a second thickness. Accordingly, the position of the center of actuation of the objective lens of the first disk becomes symmetrical with that of the second disk with respect to the suspension position in controlling the focuses. Also, the quantities of heat generated per predetermined period of time caused by the DC offsets become equal.

The above and other advantages of the present invention will become more apparent in the following description and the accompanying drawings in which like numerals refer to like parts. It is to be understood that both the foregoing general description and the following detailed description are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this specification, illustrate embodiments of the invention and, together with the description, serve to explain the principles of the invention. In the drawings.

DESCRIPTION OF PREFERRED EMBODIMENTS

Reference will now be made in detail to the preferred embodiments of the present invention, examples of which are illustrated in the accompanying drawings.

Figure 1:
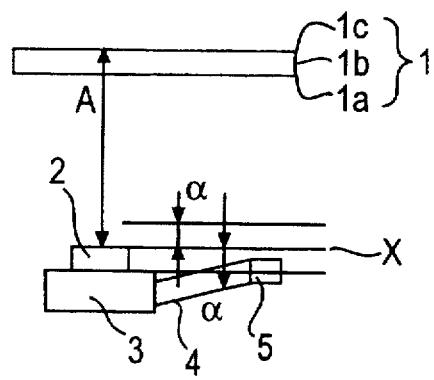
FIG. 1 is a diagram showing a basic positioning relationship related to focusing of an optical pickup unit according to a preferred embodiment of the present invention.

FIG. 1 shows an optical pickup unit according to a preferred embodiment of the present invention. In the optical pickup unit shown in FIG. 1 the dead-load suspension position X, i.e., the position of the lens holder 3 supported by the suspension base 5, is set such that a distance from the objective lens to the recording surface 1c of the optical disk 1 when no electric current is applied to the moving coil equals A+α a for a first optical disk and __A__−α a for a second optical disk having a protection layer 1b whose thickness is thinner than the protection layer 1b of the first disk. Here, "A" is a focal distance of the objective lens 2 and "α" is a length equivalent to a half of the difference between the thickness of the protection layer 1b of the first optical disk and that of the second optical disk. For example, when the first optical disk is a CD (whose protection layer is about 1.2 mm in thickness) and the second optical disk is a DVD (whose protection layer is about 0.6 mm in thickness), α is about 0.3 mm (i.e., the difference of 0.6 mm divided by two).

Figure 2A:
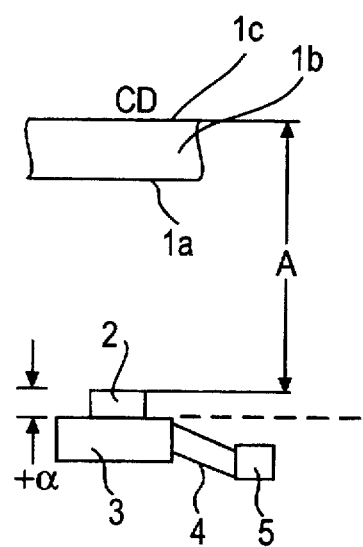
FIGS. 2a and 2b are diagrams showing basic positioning relationships related to focusing of the optical pickup unit according to a preferred embodiment of the present invention.
Figure 2B:
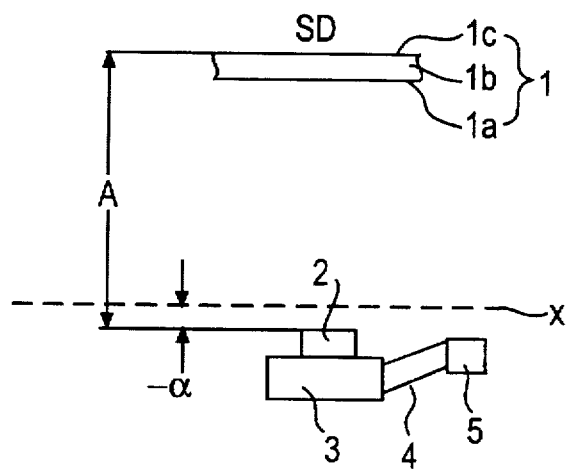

By the construction described above, the inventive optical pickup unit stationarily causes direct current offsets (equivalent to the movement α) whose moving absolute values are equal, but whose moving directions are opposite, as shown in FIGS. 2a and 2b, in controlling the focus for the CD and for the DVD. Accordingly, because the quantity of heat generated per a predetermined period of time by the DC offsets becomes equal in reproducing information from the CD and the DVD; a change in the aberration of the objective lens, which is caused by the heat, may be fixed regardless of the type of disks used, thus maintaining the pickup performance at a fixed level.

Figure 3:
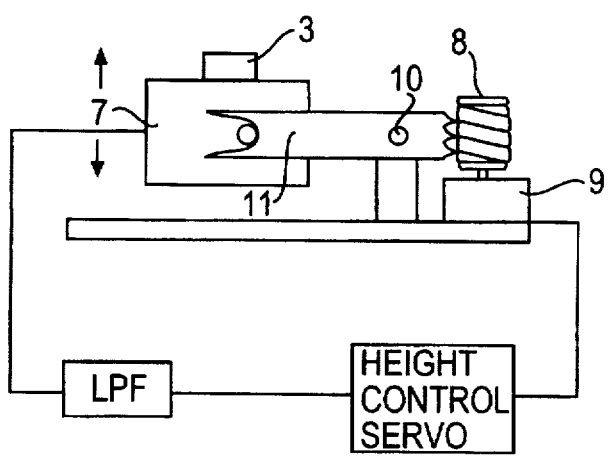
FIG. 3 is a diagram showing one example of a pickup height control mechanism.
Figure 4A:
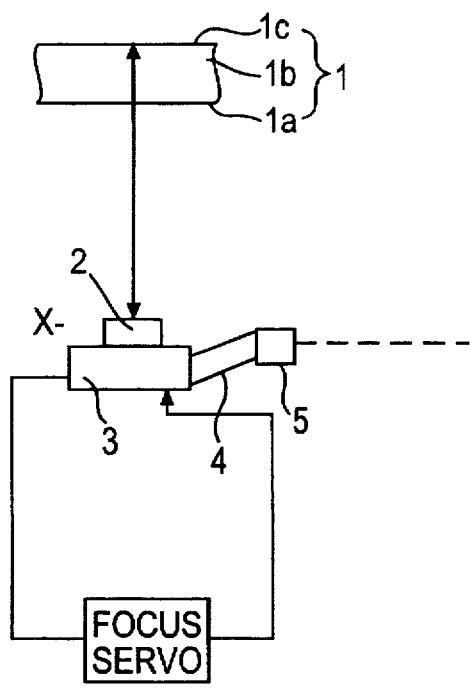
FIGS. 4a and 4b are diagrams showing positioning relationships related to focusing when a prior art optical pickup unit is used.
Figure 4B:
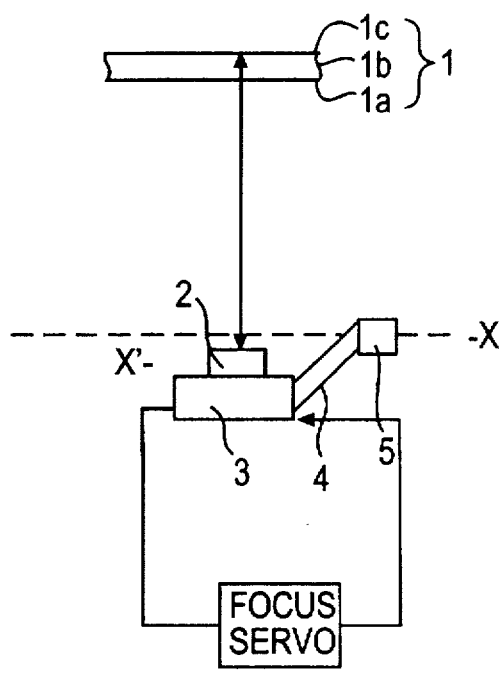
Figure 5:
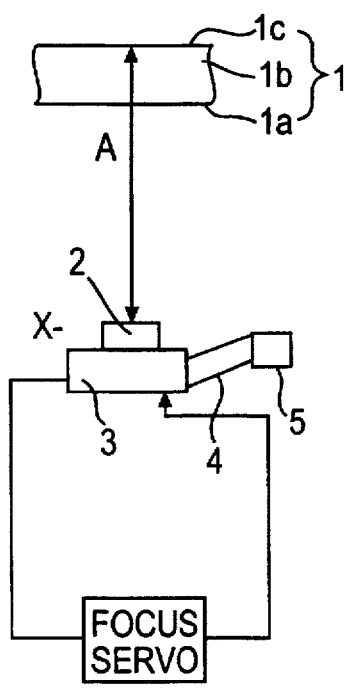
FIG. 5 is a diagram showing a positioning relationship related to focusing of the prior art optical pickup unit.

It is noted that the optical pickup unit may be constructed as shown in FIG. 3 when recorded information is to be read by one single-focal point lens from three or more types of optical disks having protection layers whose thicknesses are different from each other. In FIG. 3, a pickup body 7 contains the pickup unit constructed as shown in FIG. 1 and is oscillated or moved in the direction vertical to the disk recording surface 1c by an actuating force of an actuator motor 9 supplied via an arm 11 which oscillates or moves centering on a fulcrum 10 and a worm gear 8. An actuating signal generates the actuating force in a direction in which a difference between an absolute value (DC offset) of a low frequency component of the focus error signal given from the pickup unit contained in the pickup body 7 and a predetermined DC voltage value becomes zero. This actual signal is applied to the actuator motor 9. By the construction as described above, the quantity of DC offset applied to the pickup unit may be fixed for all kinds of disks having protection layers whose thicknesses differ from each other. It is noted that the predetermined DC offset voltage may be zero in the structure shown in FIG. 3.

Moreover, it is noted that the present invention is applicable for not only one single-focal point lens but also one plural-focal points lens, because a distance between the lens and the pickup unit differs according to each focal position.

While the preferred embodiment discussion above has been related to protection layers of optical disks having different thicknesses, the present invention also is applicable to an optical recording medium and a magneto-optic recording medium, such as a multi-layered disk having a plurality of different information recording surfaces within the same optical disk.

According to the present invention, the suspension position of the lens holder by its dead-load (including the objective lens) is such that the absolute value of the offset component of the error signal obtained in controlling the focus of the first disk whose protection layer has a first thickness, becomes or is equal to that of the second disk, whose protection layer has a second thickness. Consequently, the position of the center of actuation of the objective lens of the first disk becomes symmetrical with that of the second disk with respect to the suspension position. Also, the quantities of heat generated per predetermined period of time caused by the DC offsets become equal. Accordingly, the change of the aberration of the lens caused by the heat may be maintained at a fixed level. The pickup performance also may be maintained at a fixed level for disks whose protection layers have different thicknesses.

It will be apparent to those skilled in the art that various modifications and variations can be made in the optical pickup unit of the parent invention without departing from the spirit or scope of the invention. Thus, it is intended that the present invention cover the modifications and variations of this invention provided they come within the scope of the appended claims and their equivalents, while preferred embodiments have been described, variations thereto will occur to those skilled in the art within the scope of the present inventive concepts which are delineated by the following claims.

What is claimed is:

1. An optical pickup unit for irradiating a light beam to a first recording medium having a first disk surface, a first information recording surface, and a first distance between the first disk surface and the first information recording surface, and to a second recording medium having a second disk surface, a second information recording surface and a second distance different than the first distance between the second disk surface and the second information recording surface, to read recorded information based on reflected light of the light beam from the information recording surface upon which the light beam is being impinged, the optical pickup unit comprising:

a beam generator for generating the light beam;
an objective lens;
a lens holder for holding the objective lens;
a supporting member for supporting the lens holder;
an error signal generator for generating a focus error signal based on the reflected light of the light beam from the recording surface upon which the light beam is being impinged; and a focus control for actuating and controlling the objective lens such that the light beam is converged on the information recording surface based on the error signal, the supporting member supporting the lens holder such that a dead-load suspension position of the lens holder dead-load is positioned at a position where an absolute value of an offset component of the error signal obtained in controlling the focus for the first recording medium is equal to an absolute value of an offset component of the error signal obtained in controlling the focus for the second recording medium.

2. The optical pickup unit according to claim 1, wherein the objective lens is a single-focal point lens.

3. An optical pickup unit for irradiating a light beam to a multi-layered recording medium having a disk surface, a plurality of information recording surfaces, and a plurality of different distances from the disk surface to the plurality of information recording surfaces, respectively, to read recorded information based on reflected light of the light beam from the information recording surfaces upon which the light beam is being impinged, the optical pickup unit comprising:

a beam generator for generating the light beam;
an objective lens;
a lens holder for holding the objective lens;
a supporting member for supporting the lens holder;
an error signal generator for generating a focus error signal based on the reflected light of the light beam from the recording surfaces upon which the light beam is being impinged; and a focus controller for actuating and controlling the objective lens such that the light beam is converged on the information recording surface based on the error signal, the supporting member supporting the lens holder such that a dead-load suspension position of the lens holder is positioned at a position where an absolute value of an offset component of the error signal obtained in controlling the focus for one information recording surface of the recording medium is equal to an absolute value of an offset component of the error signal obtained in controlling the focus for another information recording surface of the recording medium.

4. An optical pickup unit for irradiating a light beam on recording surfaces of recording media to read recorded information based on reflected light of the light beam from the information recording surfaces, each of the recording media comprising a disk surface, and each of the recording surfaces being separated from its corresponding disk surface by a different distance, the optical pickup unit comprising:

a beam generator for generating the light beam;
a lens;
a lens holder for holding the lens; and
a supporting member for supporting the lens holder at a dead-load position of the lens holder which is substantially equidistant from a focal position for a first one of the recording surfaces and a focal position for a second one of the recording surfaces.

5. The optical pickup unit according to claim 4, wherein the distance between the dead-load position and each of the focal positions is substantially equivalent to one half of the difference between the distance between one of the recording surfaces and its corresponding disk surface and the distance between another of the recording surfaces and its corresponding disk surface.

6. The optical pickup unit according to claim 5, wherein the dead-load position is substantially at a focal distance of the lens.

7. The optical pickup unit according to claim 4, wherein the lens is an objective lens.

8. The optical pickup unit according to claim 4, wherein the recording surfaces are all from the same recording medium.

9. The optical pickup unit according to claim 4, wherein the recording surfaces are from different recording media.

10. The optical pickup unit according to claim 4, wherein each recording media includes a protective layer having a thickness corresponding to the distance between a recording surface and a disk surface for that disk.

11. The optical pickup unit according to claim 4, further comprising an error signal generator for generating a focus error signal based on the reflected light of the light beam from the recording surface.

12. The optical pickup unit according to claim 11, further comprising a focus controller for actuating and controlling the lens such that the light beam is converged on the information recording surface based on the error signal, the supporting member supporting the lens holder at the dead-load position such that an absolute value of an offset component of the error signal obtained in controlling the focus for the first recording surface is equal to an absolute value of an offset component of the error signal obtained in controlling the focus for the second recording surface.

* * * * *